United States Patent
Pfleger et al.

(10) Patent No.: US 6,677,685 B2
(45) Date of Patent: Jan. 13, 2004

(54) CONTROLLER FOR A CONTINUOUSLY VARIABLE TRANSMISSION

(75) Inventors: Dominique Lucienne Pfleger, Hemel Hempstead (GB); Christopher John Adams, Bedford (GB); Stephen Mark Hearn, Cheshunt (GB); Raymond Richard Bomford, Peter (GB)

(73) Assignee: Goodrich Control Systems Limited, Bedforshire (GB)

( * ) Notice: Subject to any disclaimer, the term of this patent is extended or adjusted under 35 U.S.C. 154(b) by 156 days.

(21) Appl. No.: 09/893,673

(22) Filed: Jun. 29, 2001

(65) Prior Publication Data

US 2002/0022542 A1 Feb. 21, 2002

(30) Foreign Application Priority Data

Jun. 30, 2000 (GB) ................................................ 0016182

(51) Int. Cl.⁷ ................................................ H02P 9/04
(52) U.S. Cl. ........................ 290/40 C; 290/45; 322/10; 322/40; 180/338; 180/350
(58) Field of Search ................ 290/1 R, 1 C, 290/1 D, 40 C, 45; 322/7, 10, 40, 38; 180/338, 50, 350

(56) References Cited

U.S. PATENT DOCUMENTS

| | | | |
|---|---|---|---|
| 4,541,821 A | 9/1985 | Sakakibara | |
| 4,579,021 A | 4/1986 | Yamamuro et al. | |
| 4,734,082 A | 3/1988 | Tezuka | |
| 4,832,661 A | 5/1989 | Wagner et al. | |
| 5,057,061 A | 10/1991 | Sakakibara et al. | |
| 5,402,007 A | * 3/1995 | Center et al. | 290/40 B |
| 5,755,303 A | 5/1998 | Yamamoto et al. | |
| 5,853,347 A | 12/1998 | Aoki et al. | |
| 6,054,844 A | 4/2000 | Frank | |
| 6,093,974 A | * 7/2000 | Tabata et al. | 290/40 R |
| 6,099,424 A | 8/2000 | Tsai et al. | |
| 6,274,942 B1 | * 8/2001 | Pels | 290/40 B |
| 6,307,277 B1 | * 10/2001 | Tamai et al. | 290/40 C |
| 2001/0013701 A1 | * 8/2001 | Onoyama et al. | 290/40 C |
| 2001/0039230 A1 | * 11/2001 | Severinsky et al. | 477/3 |

FOREIGN PATENT DOCUMENTS

| | | |
|---|---|---|
| EP | 0634590 A1 | 1/1995 |
| EP | 0788914 A2 | 8/1997 |
| EP | 0788914 A3 | 5/1998 |
| EP | 0937914 A2 | 8/1999 |

OTHER PUBLICATIONS

Pfleger, Dominique Lucienne, et al., Belt Clamp Force Controller, U.S. patent application Ser. No. 09/893,675, filed Jun. 29, 2001.

Hearn, Stephen Mark, et al., Deaerator, U.S. patent application Ser. No. 09/893,409, filed Jun. 29, 2001.

Howard, Rodney Stuart, Oil System, U.S. patent application Ser. No. 09/893,674, filed Jun. 29, 2001.

* cited by examiner

Primary Examiner—Nicholas Ponomarenko
(74) Attorney, Agent, or Firm—Hunton & Williams Withers & Rogers (57) ABSTRACT

A clamp pressure controller for a variable ratio belt drive system for a generator is provided. The controller monitors the voltage at the output of the generator. If this falls the controller increases the clamp pressure so as to prepare the drive system for the additional torque/force it will be required to transmit. The increase in clamp pressure is rapid so as to prevent belt slip from occurring.

18 Claims, 7 Drawing Sheets

Fig.6a. load

Fig.6b. voltage

Fig.6c. pressure

Fig.6d. Torque

Fig.9.

CONTROLLER FOR A CONTINUOUSLY VARIABLE TRANSMISSION

BACKGROUND OF THE INVENTION

1. Field of the Invention

The present invention relates to a control system for use with a continuously variable transmission which transmission incorporates a belt drive. The transmission is used to drive a generator at constant speed.

2. Description of Related Art

Aircraft electrical systems can require a power generation system which produces an electrical output at a substantially constant frequency. A method of providing this has been to use a variable ratio coupling between the generator and the engine. An example of such a "constant frequency drive" can be found in U.S. Pat No. 4,609,842 wherein the constant drive takes the form of a hydraulic pump and motor and differential to achieve a constant output speed in relation to a varying input speed GB 2220038 discloses the provision of a constant speed drive for an electrical generator in which a continuously variable transmission employing a belt is disclosed. Such belt drive technology has great potential within an aircraft electrical environment, but in order to ensure good in-service life and reliability, the clamping pressure exerted upon the belt needs to be carefully controlled. However, the belt must not be allowed to slip at any time, therefore a fast acting control system is required.

SUMMARY OF THE INVENTION

According to a first aspect of the present invention, there is provided a clamp pressure controller for controlling the clamping pressure applied to a belt of a continuously variable transmission, which transmission is in combination with a generator, the controller having a fast response mode such that in response to an input indicative of an event that may result in an increase in mechanical load transmitted through the continuously variable transmission, the controller initiates an increase in the clamp pressure in order to protect the continuously variable transmission against belt slippage.

It is thus possible to provide a control system which is "protective" of the drive belt within the continuously variable transmission. Use of a continuously variable transmission within an aircraft electrical power generation system must satisfy the conflicting requirement of high reliability and long service intervals. In use, the belt is clamped between two inclined surfaces which act to define either side of a variable ratio pulley. An increase in clamping pressure increases the rate of wear and fatigue of the belt exponentially. Thus it is desired to keep the clamping pressure as low as possible. However, should the belt slip with respect to the clamping surfaces, then both these and the belt become damaged and failure of the continuously variable transmission can result quickly. Thus it is imperative that slippage between the belt and the pulley is eliminated. This implies a higher clamping pressure which, as noted hereinabove, reduces the belt life. The clamp pressure controller of the present invention allows the clamping pressure to be optimized in order to maintain belt life, whilst simultaneously acting to rapidly protect the belt in the event of an increase in load.

Preferably the control system either monitors the output voltage of the generator, or is responsive to a device monitoring the output voltage of the generator. The output voltage from the generator may be measured either in absolute terms, or the peak values may be measured and changes in these used to infer that an increase in mechanical load through the continuously variable transmission is going to occur. The applicant has realized that mechanical inertia and electrical properties of the generator give rise to a small lag between the time at which an increase in electrical load occurs at the generator, and the time at which this increased load results in an increase in the mechanical torque that needs to be transmitted via the continuously variable transmission. This lag is small, being typically between 30 to 40 milliseconds, but can be used to prepare the continuously variable transmission such that it is protected from damage.

The control system also monitors the input speed derived from the engine speed. The input speed is used together with the generator load to determine the amount of clamp pressure.

Preferably the clamp pressure is increased by a predetermined amount to accommodate an increase in mechanical load. This increase may be a fixed increment, a percentage of the current generator load or current generator clamp pressure, an increase to a value calculated as a function of the estimated load that has occurred, or an increase to a predetermined clamp pressure, such as maximum clamp pressure. This latter option is preferred since it gives the greatest protection against slippage.

The response may vary depending on the nature of the input to the controller. Thus, some loads may be relatively low priority loads of a known magnitude. An example of this is an oven within the galley of an aircraft. A request for power by the oven may be signaled to an aircraft load controller which may then send a signal to the clamp pressure controller indicating that this known load will be switched on, either in a predetermined time period, or once the clamp pressure controller has indicated that it has prepared the continuously variable transmission for the load. Under such circumstances, the clamp pressure controller can estimate the required clamping pressure as a function of the new power demand that will occur once the oven has switched on. The clamp pressure controller can then set the clamp pressure accordingly, and once this has been achieved, it can signal to the load controller that the oven can now be switched on. However, not all loads can be conveniently scheduled in this manner, and the controller needs also to be responsive to a sudden demand placed on the generator, for example as a result of an emergency condition or failure in another generator or other device connected to the electrical system.

Advantageously the clamp pressure controller also operates in a further control mode which corresponds to a normal control mode of the controller, wherein the controller regulates the clamp pressure to obtain a minimum clamp pressure value, consistent with having a safety margin against slippage. Thus in the normal control mode, clamp pressure is regulated as a function of electrical load on the generator and the input speed.

The electrical load may be calculated as the product of the current supplied by the generator and the voltage across the generator. However, this approach may over estimate the real generator load on the continuously variable transmission since many of the load devices may be reactive, thereby giving rise to a phase change between the current wave form and the voltage wave form. Advantageously the phase change is measured, and this is used to introduce a power factor correction such that the load on the continuously variable transmission can be more accurately calculated.

According to a second aspect of the present invention, there is provided a clamp pressure controller for controlling the clamping pressure applied to a belt in a continuously variable transmission in combination with a generator, the controller being arranged to calculate a desired clamp pressure as a function of the generator output voltage, generator output current and the phase angle between the voltage and current wave forms and the input speed.

BRIEF DESCRIPTION OF THE DRAWINGS

The present invention will further be described, by way of example, with reference to the accompanying drawings, in which.

DETAILED DESCRIPTION OF THE INVENTION

Figure 1:
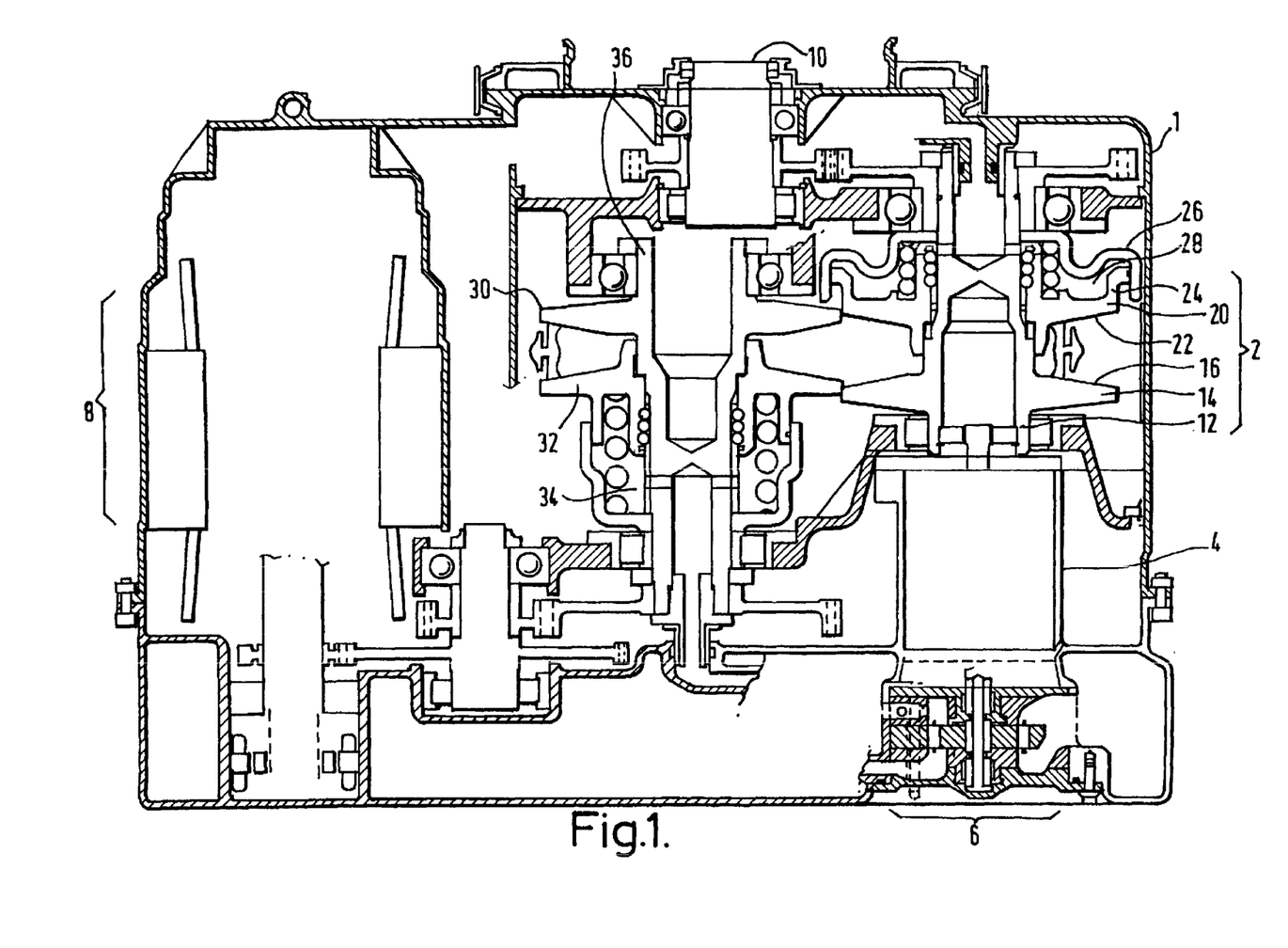
FIG. 1 is a schematic cross section through a constant speed generator for use in an aircraft electrical generation system.

The generator shown in FIG. 1 comprises a housing 1 which encloses a continuously variable transmission utilizing a belt drive, generally designated 2, a low pressure pump 4, a high pressure pump 6, a generator, generally designated 8, and an oil system disposed throughout the housing 1.

The belt drive 2 enables the variable speed of an input shaft 10 which receives a drive from a spool of a gas turbine engine to be converted to a near constant speed such that the generator 8 can be run at a near constant speed. In order to do this, a first shaft 12 of the belt drive mechanism carries a flange 14 which defines an inclined surface 16 against which a drive belt bears. The shaft 12 also carries a coaxially disposed movable flange 20 drivingly connected to the shaft 12 via a splined portion (not shown). The movable flange 20 defines a further inclined surface 22 facing towards the surface 16, which surfaces serve to define a V-shaped channel whose width can be varied by changing the axial position of the flange 20 with respect to the fixed flange 14. The flange 20 has a circularly symmetric wall 24 extending towards and cooperating with a generally cup shaped element 26 carried on the shaft 12 to define a first hydraulic control chamber 28 therebetween which is in fluid flow communication via a control duct (not shown) with an associated control valve. Similarly, a fixed flange 30 and a movable flange 32 are associated with a second shaft 36 and a second hydraulic control chamber 34. A steel segmented belt having a cross-section in the form of a trapezium, with the outer most surface being wider than the inner most surface is used to interconnect the first and second variable ratio pulleys formed between the pairs of fixed and movable flanges, respectively, in order to drivingly connect the flanges.

The position of each movable flange with respect to the associated fixed flange is controlled by the hydraulic control chambers. Since the interconnecting belt is of a fixed width, moving the flanges closer together forces the belt to take a path of increased radial distance. The interconnecting belt has a fixed length, and consequently as one movable flange is moved towards its associated fixed flange, the other movable flange must move away from its associated fixed flange in order to ensure that the path from an arbitrary starting point, around one of the pulleys, to the second pulley, around the second pulley and back to the fixed arbitrary starting point remains a constant distance.

It is important in such a pulley system that the position of the flanges can be well controlled. It is also important that the clamp force exerted upon the belt can be well controlled since belt wear and fatigue increases rapidly with clamp force but belt slippage is damaging to both the belt and the pulleys. Thus a controller or control system (not shown) is provided which controls both the generator frequency and the clamp force exerted on the belt.

Figure 2:
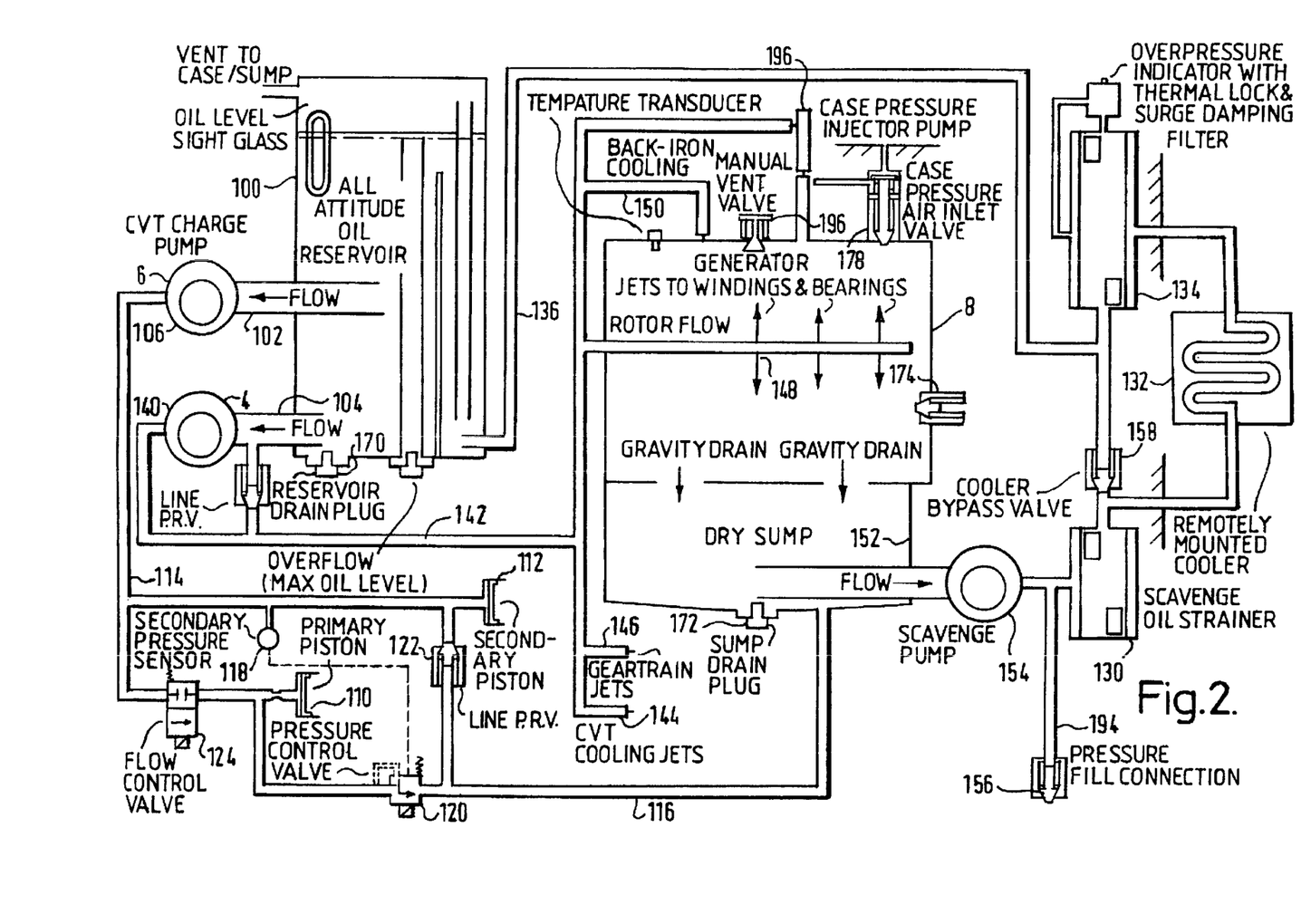
FIG. 2 illustrates an oil system, including control valves, associated with the generator shown in FIG. 1.

In order to fully appreciate the operation of a control system for the generator, it is necessary to have an understanding of the oil/hydraulic system associated with it. FIG. 2 schematically illustrates the oil system within the power generation system. An oil reservoir 100 acts to contain de-aerated oil. The reservoir has a first outlet 102 connected to an inlet of the high pressure pump 6 and a second outlet 104 connected to an inlet of the low pressure pump 4. An outlet 106 of the high pressure pump 6 provides oil which is ducted towards a primary piston 110 formed by movable flange 20 and the cup shaped element 26 (FIG. 1) thereby defining the first hydraulic control chamber 28, and a secondary piston 112 (similar to the primary piston) which contains the second hydraulic control chamber 34. As shown in FIG. 2, both the primary piston 110 and the secondary piston 112 can be regarded as being connected between a high pressure supply line 114 and a low pressure return line 116. The pressure in the high pressure line 114 is measured by a pressure sensor 118 and supplied to a controller (not shown). The controller uses a measurement of oil pressure, aero-engine drive speed and/or generator speed and electrical demand to schedule and/or control the hydraulic pressure acting in the primary and secondary pistons. The secondary piston 112 is connected directly to the high pressure line 114. However, the pressure within the high pressure line 114 can be controlled by spilling pressurized lubricant from the high pressure line 114 to the low pressure return line 116 via an electrically controlled pressure control valve 120 connected between the high pressure and low pressure lines, respectively. Thus in order to increase the hydraulic pressure within the secondary piston 112, the pressure control valve 120 is moved to restrict flow therethrough, and in order to release pressure within the secondary piston, the pressure control valve 120 is opened. A normally closed pressure return valve 122 is connected between the fluid port to the secondary piston 112 and the low pressure return line 116. The valve 122 is normally closed, but is set to open at a predetermined pressure in order to protect the hydraulic system in the event of system over pressure.

The primary piston 110 receives high pressure fluid from the high pressure line 114 via an electrically operated flow control valve 124. The valve 124 is in series with the pressure control valve 120 between the high pressure line 114 and the low pressure line 116, and the primary piston 110 is connected to the node between these valves. This configuration of valves means that the pressure control valve 120 can be used to simultaneously increase the pressure in both the primary and secondary pistons in order to prevent belt slippage, whereas the balance of flow rates through the control valve 124 and the pressure control valve 120 sets the relative positions of the primary and secondary pistons. Oil from the low pressure line 116 is returned to the sump 152.

An outlet 140 of the low pressure pump 4 supplies oil via supply line 142 to oil cooling jets 144 for spraying oil into the moving parts of the continuously variable transmission, to jets 146 for spraying oil onto the gear train interconnecting the transmission to the generator, to jets 148 for lubricating the windings and bearings within the generator and also along a cooling path 150 for cooling the stator within the generator.

The generator 8 has a gravity drain to a dry sump 152. Oil collecting in the sump 152 is pumped out of the sump by a single scavenge pump 154. The output line from the scavenge pump connects with the low pressure return line 136 via an oil strainer 130, a remotely mounted oil cooler 132 and an oil filter 134. A pressure fill connector 156 is in fluid flow communication with the low pressure return line 194 in order to allow the oil system to be filled. An oil cooler by-pass valve 158 is connected between the output from the strainer 130 and the line 136 in order to by-pass the oil cooler and oil filter during cold start or in the event of cooler, filter or external line blockage. The oil by-pass valve is normally closed and set to open at a predetermined over pressure.

In order to drain the system, a drain plug 170 is provided in the reservoir, similarly a drain plug 172 is provided for the swap and a pressure operated vent valve 174 is provided in the generator in order to relieve the excess pressure occurring within the generator. A manually operated vent valve 176 is provided to vent pressure from the generator. An automatic air inlet valve 178 is provided to allow air to enter the generator via an injector pump 196 to provide positive internal pressure.

Figure 3:
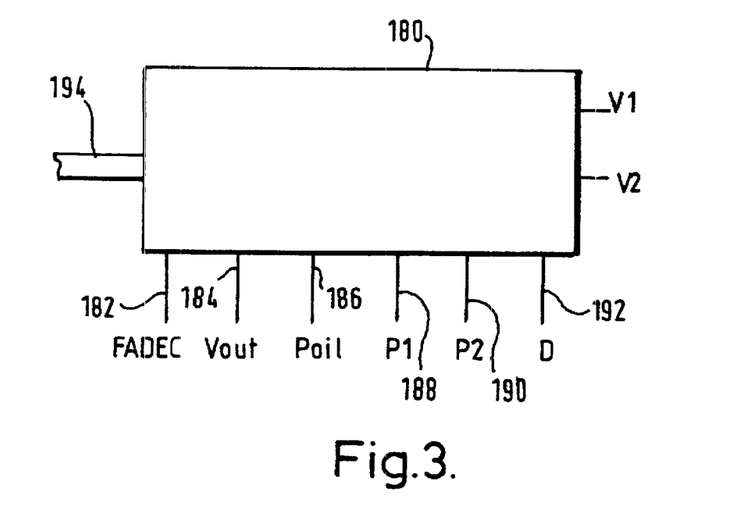
FIG. 3 schematically illustrates a controller constituting an embodiment of the present invention.

The controller for the continuously variable transmission 180, shown diagrammatically in FIG. 3, has a first input 182 for accepting speed data from a full authority digital engine controller (FADEC) (which controls a gas turbine engine driving the generator) or any other sensing device or system to which the generator is connected. The input 182 accepts information relating to the speed of the input shaft 10. A second input 184 receives data representative of the output frequency of the electrical generator. A third input 186 may be provided for receiving oil pressure measurements relating to oil pressure within the first hydraulic control chamber 28 and the second hydraulic control chamber 34. A fourth input 188 may be provided for receiving information representative of the position of the first movable flange 20, and a second input 190 may be provided for receiving information representative of the position of the second movable flange 32. However, these inputs 188 and 190 may be omitted if desired since the expected position of the flanges can be calculated a priori from the knowledge of the input shaft speed and the generator speed, assuming that no belt slippage occurs. A "D" input 192 may also be provided for receiving measurements of the power output being demanded of the generator 8. The controller may also have a bi-directional data-bus 194 for exchanging data with other controllers within the electrical system and has first and second outputs VI and V2 for controlling the electrically operated valves 120 and 124 which in turn control the pressure of hydraulic fluid within the first and second hydraulic control chambers.

Figure 4:
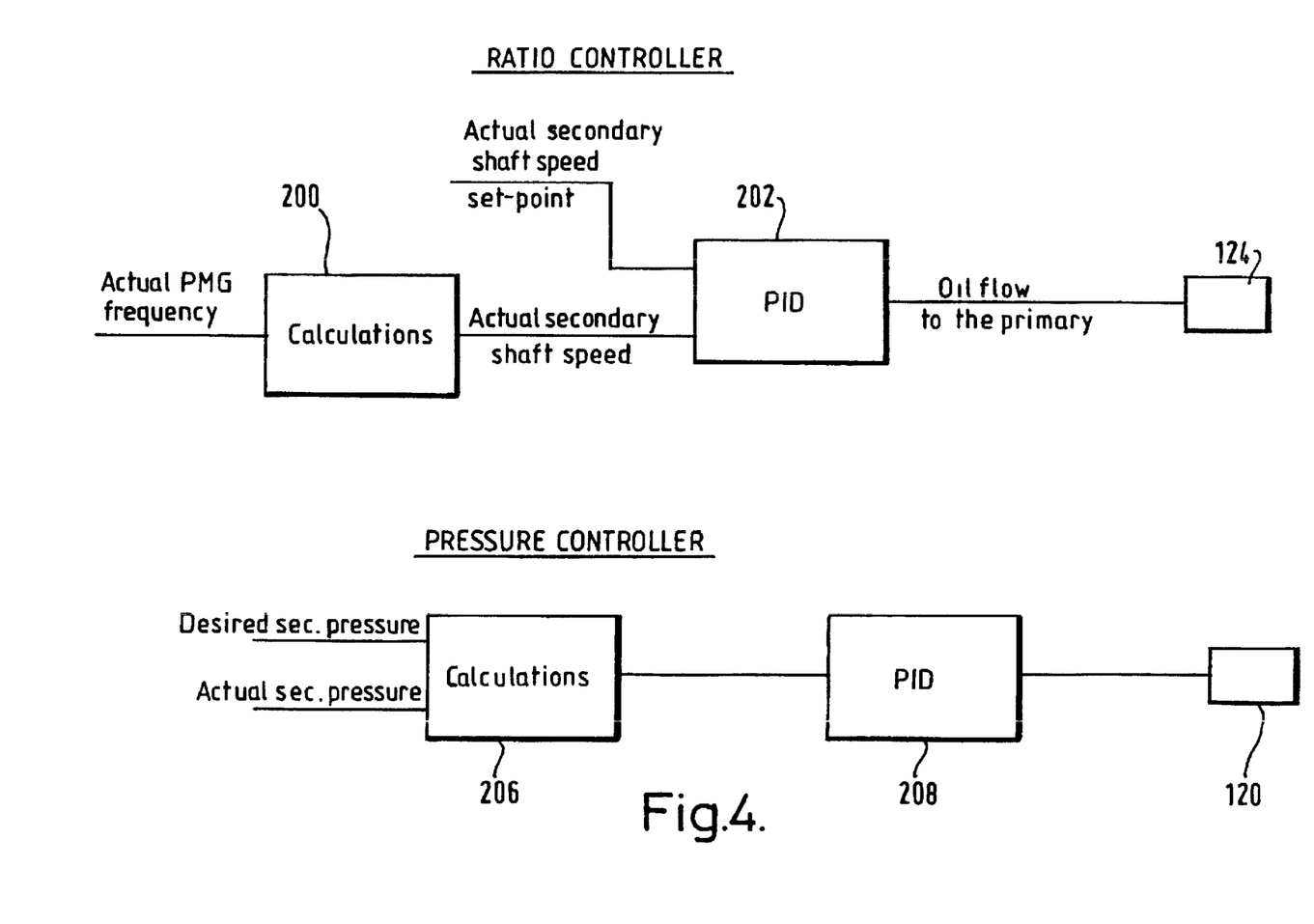
FIG. 4 schematically illustrates control subsystems within the controller of FIG. 3.

Based on the knowledge of the target and actual speed of the shaft 36 (as derived from the generator permanent magnet generator (PMO) frequency as shown in subcontrol system 200, see FIG. 4), the controller ran calculate the desired oil flow within the system. This oil flow may be input to a further controller 202, such as a three term proportional-integral-derivative controller in order to generate an output signal for actuating the electrically controlled valve 124.

It is possible, in some circumstances, for the speed controller to act solely in response to the measured PMO frequency of the generator. Whilst this may give acceptable control whilst the engine and generator are running during use, it may give rise to problems during a start up phase since the natural action of such a closed loop controller would be to increase the transmission ratio to its maximum value during start up thereby increasing the torque acting on the prime mover, i.e. the gas turbine engine, during a phase when it is least able to provide power to auxiliary systems.

The controller 180 also includes a pressure control subsystem which receives data representative of the actual clamp pressure in the second piston via sensor 118 and, optionally, other system variables which may include the actual or desired pressure in the primary piston and the desired clamp pressures, and passes this to a pressure scheduling unit 206 which calculates the difference between the actual and desired clamp pressures, and which may modify this difference in accordance with other parameters, and which then passes information to a further three term controller 208 which has an output connected to the pressure control valve 120. The controller 208 may be arranged to take a precedence over the controller 204 since belt slippage cannot be tolerated whereas limited speed inaccuracy can be. The controller 180 is also arranged to increase the clamp pressure rapidly to a predetermined, for example, maximum, value in response to a signal received on the demand line 192 which indicates that the change in load of sufficient magnitude may occur in the electrical system.

Figure 5:
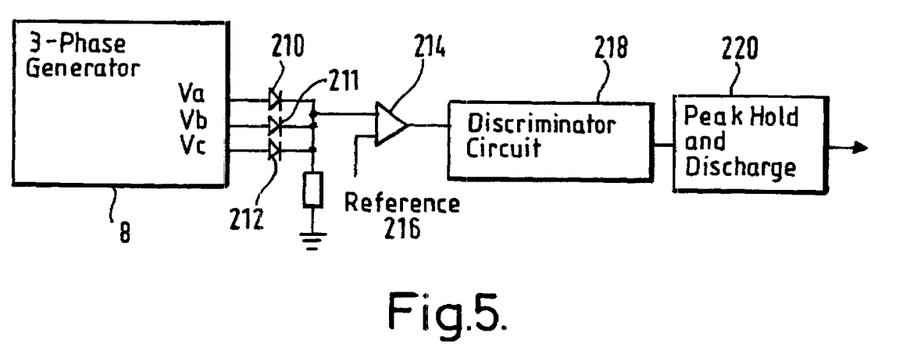
FIG. 5 schematically illustrates an apparatus for detecting transient changes to generator output resulting from changes in the electrical load supplied by the generator.
Figure 6A:
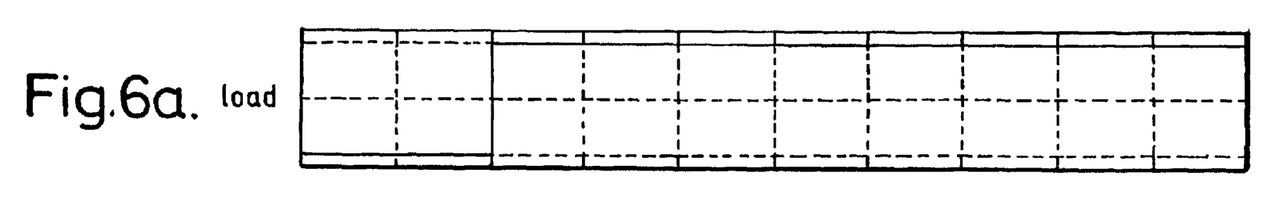
FIGS. 6a, 6b, 6c and 6d show the variation of electrical load, electrical voltage, clamp pressure and torque transmitted through the continuously variable transmission as a function of time.
Figure 6B:
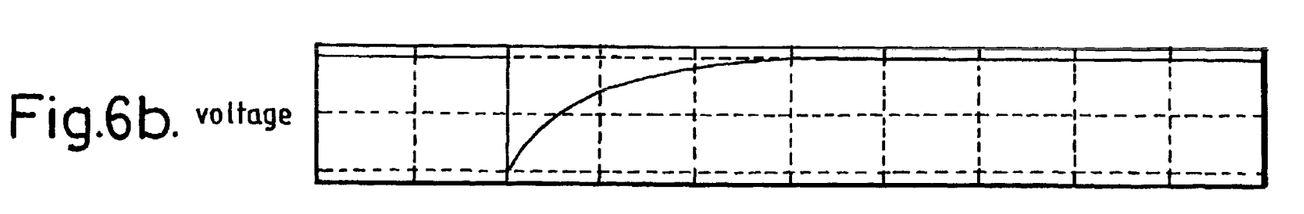
Figure 6C:
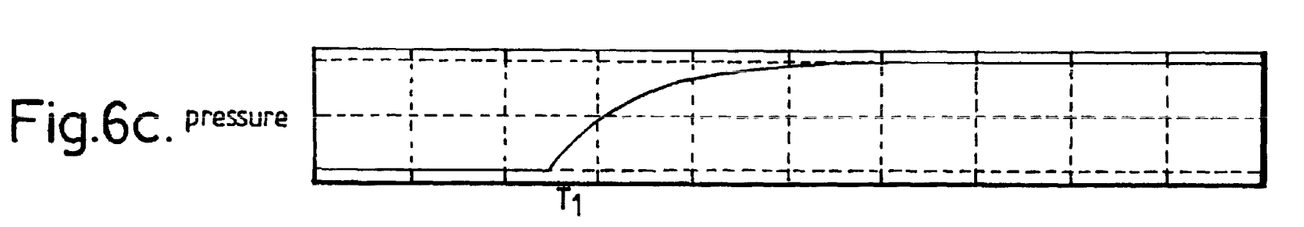
Figure 6D:
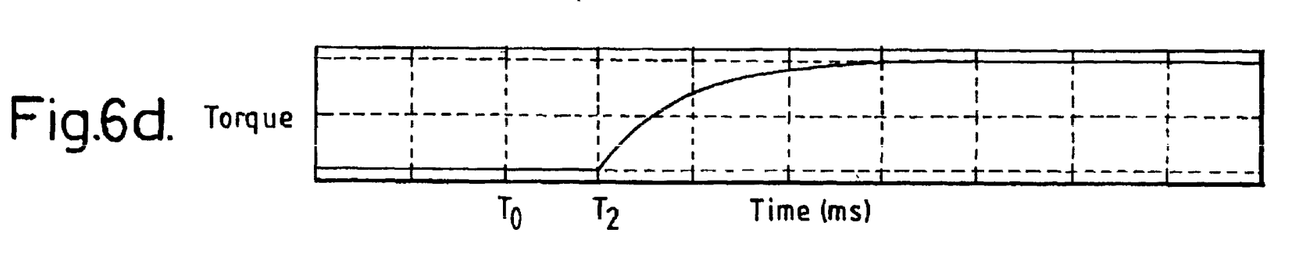

FIG. 5 schematically illustrates a system for monitoring the output of the generator 8 in order to determine whether a sudden increase in electrical load of the generator might result in belt slippage in the continuously variable transmission. The generator is a three phase generator and each phase gives rise to an output voltage $V_A$, $V_B$ and $V_C$, respectively. The voltage on each phase is passed through an associated diode 210, 211 and 212, the output of each diode is supplied to a first input of a comparator 214. A second input of a comparator receives a reference signal 216 which may either be supplied from a constant voltage source, or which may be derived as an average of the output of the generator. An output of the comparator is supplied to an input of a discriminator 218 which serves to detect transitions on the comparator output. An output of the discriminator is supplied to an input of a peak hold and discharge device 220 which serves to hold the fact that transition has occurred for a predetermined time period, and in effect may be regarded as functioning as a mono-stable. An output of the peak hold device is provided to the controller 180 via the demand input 192. The circuit is arranged to detect short term voltage drops above a predetermined threshold.

The operation of this circuit can be understood more fully with reference to FIG. 6. FIG. 6a shows the electrical load acting on an output of the generator. At a time T0, the load undergoes a step increase to a new higher value. This increase in load, as shown in FIG. 6b, is accompanied by a step decrease in the root-mean-square (RMS) voltage occurring at the output of the generator. The voltage supplied by the generator will then return towards its nominal output voltage as the voltage generator control circuits cut in to stabilize its voltage. The output of the generator is compared to that of the reference, and if this voltage decrease exceeds a predetermined value the output of the comparator changes state. This discrete signal, after processing by the discriminator circuit and the peak hold circuit is supplied to the controller 180 which responds by actuating the electrically operated valves to apply fall clamping pressure to the belt. Clearly, the increase in clamping pressure is limited by fluid flow dynamics, but nevertheless, as shown in FIG. 6c, the pressure starts to rise at a time T1. The mechanical inertia of the generator, and the fact that the extra load can be temporarily accommodated by a collapse in the magnetic field surrounding the generator, means that the continuously variable transmission is not subjected to an extra torque transfer until the time period T2 which occurs after time T1. Thus the controller has time to prepare the pressure acting on the belt within the continuously variable transmission in order to allow the transmission to accommodate a higher torque load prior to it being subjected to that load. The signal to apply the higher torque load may be provided via a further input to the PID controller 208, such that once the signal to maximize the torque load has been removed, the normal control response of the controller is resumed in a smooth manner. The signal to apply maximum pressure in response to a transient is itself only of short duration, in the region of a few tenths of a second.

As noted hereinbefore, it is advantageous that the clamp force acting on the belt be reduced to a minimum value consistent with making sure that slip does not occur. Typically, the clamp pressure will be scheduled as a function of generator output, and will include a margin of error. Schemes for scheduling the pressure have been described in the prior art and in a copending application by the present applicant. However, the applicant has realized that simple measurements of electrical load ignore the fact that reactive devices may be provided within the aircraft electrical system. and consequently that power factor calculation can give further benefits, by enabling the true electrical load to be calculated.

Figure 7:
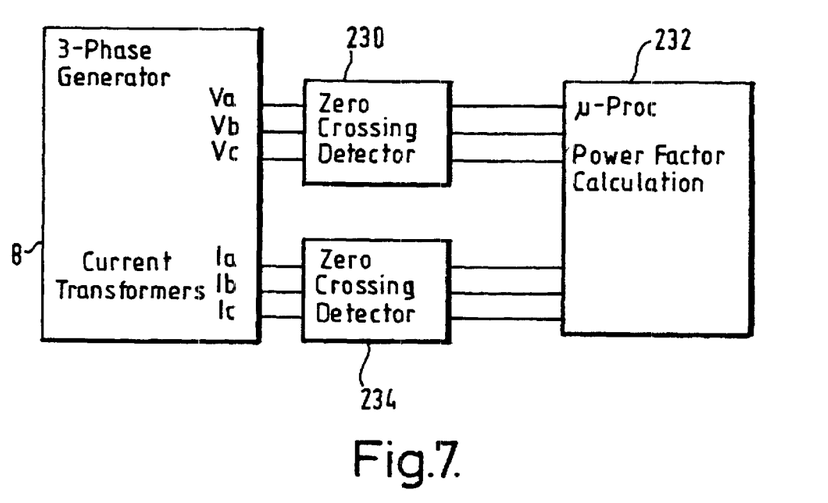
FIG. 7 schematically demonstrates an apparatus for calculating the power factor of the generator.

The arrangement shown in FIG. 7 shows an apparatus for calculating power factor. Devices for measuring the generator output voltage and generator output current are already provided on aircraft systems. In the arrangement shown in FIG. 7, the voltage from each phase A, B and C of the generator 8 is supplied to a respective input of a zero crossing detector 230 which serves to identify when the voltage wave form crosses through zero and sends a signal to a power factor calculation unit 232. Similarly, a zero crossing detector 234 monitors the current wave forms Ia, Ib and Ic derived from current transformers in order to identify zero crossing in the current wave forms. This unit also sends signals indicating the time that a zero crossing occurs to the power factor calculation unit 232. For each phase, the power factor calculation unit compares the time difference between the current zero crossing and voltage zero crossing as a fraction of the cycle time in order to generate a phase difference signal for that phase. This phase difference signal is then used by a power demand calculator to calculate the output power being supplied in each phase using the equation:

$$POWER_{PHASE} = VOLTAGE_{PHASE} \times CURRENT_{PHASE} \times COSINE(PHASE\ DIFFERENCE_{PHASE})$$

Thus an accurate estimate of true power generation from the generator can be made, and the belt pressure scheduled in accordance with the actual demand, including power factor correction, rather than the expected demand calculated excluding power factor correction. This allows the belt pressure to more accurately track the required torque transfer through the continuously variable transmission than might otherwise occur.

Figure 8:
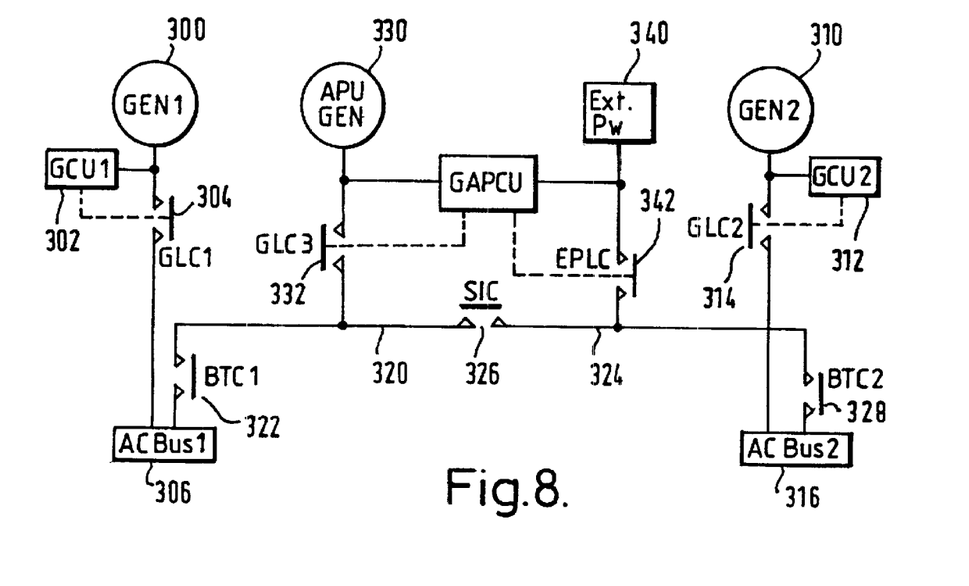
FIG. 8 schematically illustrates a simplified aircraft electrical system wherein power distribution can be transferred from one generator to another.
Figure 9:
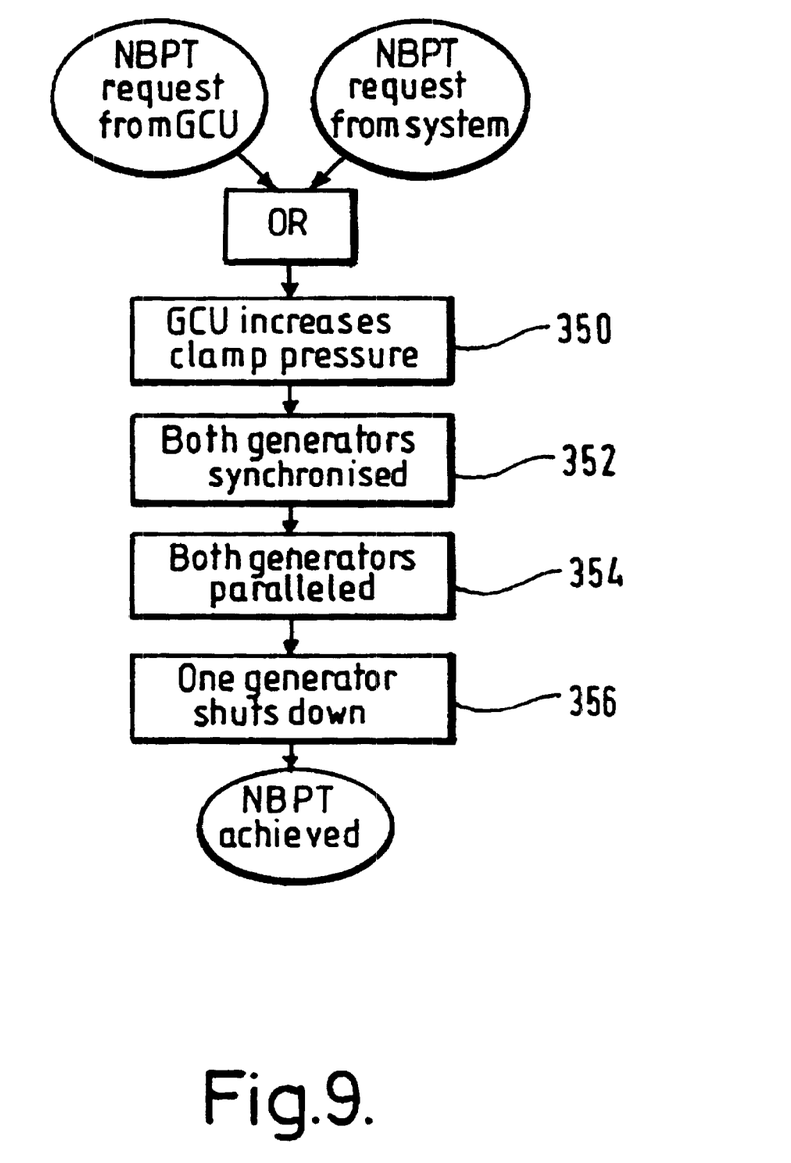
FIG. 9 is a flow chart for power transfer between one generator and another without interruption.

Additionally, with increasing reliance on electrical systems within an aircraft, it is imperative that a smooth hand over of power from one generation source to another can be achieved. FIGS. 8 and 9 illustrate how this can be achieved. Starting with FIG. 8, an aircraft electrical system may comprise a first generator 300 associated with a respective controller 302 and an electrically operated switch 304 to a first aircraft bus 306. Similarly a second generator 310 having an associated generator controller 312 can be connected via an electrically operated switch 314 to a second aircraft bus 316. The first aircraft bus 306 can also be connected to a supply line 320 via a switchable contact 322. The supply line 320 can be connected to a further supply line 324 via a switch 326, which supply line 324 can be connected to the second aircraft bus 316 via a further switch 328. The supply line 320 can be connected to an auxiliary power unit 330 via a switch 332 and the supply line 324 can be connected to an external power source 340 via a switch 342. Thus power from the auxiliary power unit 330 can be supplied to the first bus 306 via switches 322 and 332 or to the second aircraft bus via switches 332, 326 and 328. Similarly the external power unit can also be connected to the first aircraft bus 306 or the second aircraft bus 316 via the appropriate switches. Furthermore, the first generator 300 can also be used to supply power to the second aircraft bus 316 via switches 304, 322, 326 and 328. Thus the configuration allows parts of the system to be isolated but also to be accessible to remote parts of the system. During normal use, switch 326 would be open, thereby isolating buses 306 and 316 from each other. However, in the event of a power transfer being required (for example during engine run down, engine run up or loss of a power source) it becomes necessary for one generator to supply both buses in order that operation of essential electrical equipment on each bus can be maintained. Such transfer may be required without interruption to the electrical system. Such an operation is termed a 'no break power transfer", or NBPT for brevity.

The controller 302, 312 of one of the generators can receive an NBPT request via the data bus 194 from other controllers within the system. Once it has received the request control passes to step 350 (FIG. 9) where the controller increases the clamp pressure to a maximum value Following this, control passes to step 352 where the controllers 302 and 312 negotiate with one another and vary the drive ratios in order to synchronize the generators. Once the generators are synchronized, control passes to step 354 where interconnecting switches 322, 326 and 328 are closed in order to connect the generators in parallel. Once this has been achieved, the other generator is shut down at step 356 thus power transfer is achieved without any break in supply and the switch 304 or 314 associated with this generator is then opened to isolate it.

It is thus possible to provide a clamp force controller which serves to protect the belt from slippage, and which can increase the belt pressure in response to unexpected load transients, or scheduled load changes.

We claim:

1. A clamp pressure controller for controlling the clamp pressure applied to a belt of a continuously variable transmission, which transmission is in combination with a generator, the controller having a fast response mode such that in response to an input indicative of an event that may result in an increase in mechanical load transmitted through the continuously variable transmission, the controller initiates an increase in the clamp pressure in order to protect the continuously variable transmission against belt slippage.

2. A clamp pressure controller as claimed in claim 1, in which the clamp pressure controller monitors the output of the generator, or is responsive to a device monitoring the output of the generator, such that the occurrence of an increased electrical load can be detected.

3. A clamp pressure controller as claimed in claim 2, in which the output voltage of the generator is monitored and changes in the output voltage are used to infer when a change in load has occurred.

4. A clamp pressure controller as claimed in claim 1 in which the clamp pressure is increased by a predetermined amount in response to a system request.

5. A clamp pressure controller as claimed in claim 1, in which the clamp pressure is increased by a predetermined amount in response to the increased electrical load.

6. A clamp pressure controller as claimed in claim 5, in which the pressure increase is a fixed increment.

7. A clamp pressure controller as claimed in claim 5, in which the pressure increase is proportional to the current generator load or current generator clamp pressure.

8. A clamp pressure controller as claimed in claim 5, in which the pressure is increased as a function based on an expected electrical load.

9. A clamp pressure controller as claimed in claim 5, in which the pressure is increased to a predetermined clamp pressure.

10. A clamp pressure controller as claimed in claim 9, in which the predetermined pressure is the maximum clamp pressure.

11. A clamp pressure controller as claimed in claim 8, in which, where loads have a known magnitude the clamp pressure controller is arranged to receive a request to power the load from a load controller, and to set the clamp pressure to a new value based on the new power demand.

12. A clamp pressure controller as claimed in claim 11, in which the clamp pressure controller is arranged to signal that the new load can be connected.

13. A clamp pressure controller as claimed in claim 1, in which the controller operates in a further control mode wherein the controller regulates the clamp pressure to obtain a minimum clamp pressure consistent with having a safety margin against slippage.

14. A clamp pressure controller as claimed in claim 2, wherein the output of the generator is measured by measuring the voltage wave form, the current wave form and the phase difference between the current and voltage wave forms such that the electrical load can be calculated.

15. A clamp pressure controller as claimed in claim 1, in which once the signal to increase the clamp pressure has been removed, the clamp pressure is reduced to that which is calculated during non-transient conditions.

16. A clamp pressure controller for controlling the clamping pressure applied to a belt in a continuously variable transmission combination with a generator, the controller being arranged to calculate a desired clamp pressure as a function of generator output voltage, generator output current and phase difference between the voltage and current wave forms.

17. A clamp pressure controller as claimed in claim 16, in which the controller monitors the generator output and temporarily increases the clamp pressure in response to an event which indicates an increase in electrical load.

18. A clamp pressure controller as claimed in claim 17, in which the clamp pressure is temporarily increased to its maximum pressure.

* * * * *